GEAR RAISING AND SYNCHRONIZING CAM

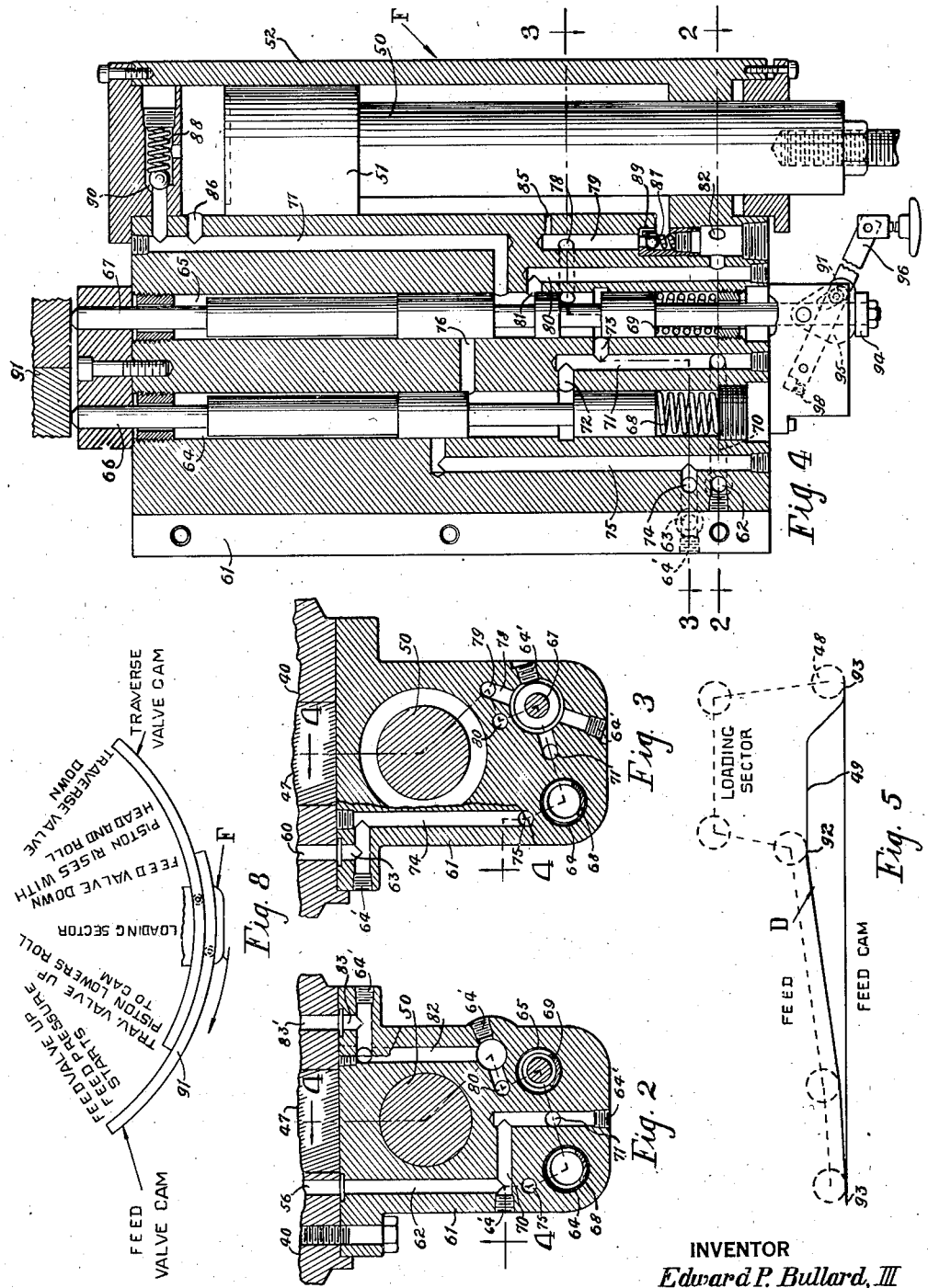

INVENTOR
Edward P. Bullard, III
BY
Paul M. Grist
ATTORNEY

Patented Aug. 15, 1944

2,356,028

UNITED STATES PATENT OFFICE 2,356,028

HYDRAULIC MACHINE TOOL

Edward P. Bullard, III, Fairfield, Conn., assignor to The Bullard Company, a corporation of Connecticut Application December 27, 1940, Serial No. 371,859

21 Claims. (Cl. 29—38.)

This invention relates to machine tools and particularly to fluid-operated mechanism for moving a tool holder toward and away from a work-supporting member.

Machine tools of the type that employ a cam and follower for controlling the movement of a tool support toward and from the work-supporting member usually include a double track cam, namely, one having effective surfaces on either side of the cam follower, and provide relative rotation between the cam and the tool support during an operation. Machine tools of this type are required to move the tool support at a relatively rapid speed toward and from the work-supporting member prior to, and after a working operation, during the latter of which the tool support is fed at a relatively slow rate toward the work-supporting member. Due to the limitations imposed upon such structure including the practical cam angle for such work, a great portion of the relative rotation between the cam drum and the tool support is required for non-productive operation, such as the traverse movement of the tool support toward and away from the work-supporting member. Additionally, in such machine tools, the stroke of the tool support is definitely limited by the diameter of the cam drum. Any substantial stroke of the tool support requires a cam drum of impractically large diameter because a relatively long cam path is required to move the tool support throughout the substantial stroke.

An object of this invention is to provide a machine tool of the above described type which includes mechanism that will overcome the above as well as other difficulties encountered in prior known machine tools of this type.

Other objects of the invention include the provision of a machine tool in which the tool support is adapted to be moved toward and away from the work-supporting member at a relatively rapid speed during a relatively small portion of the rotation between the tool support and the tool-support feeding cam; the provision of a machine tool in which the tool support is restricted to a predetermined rate of movement toward the work-supporting member but unrestricted with respect to movement away from said work-supporting member; the provision of a machine tool in which the tool support is moved toward and from the work-supporting member by fluid-operated means having snubbing characteristics; the provision of a machine tool in which the tool support is adapted to be moved toward and away from the work-supporting member by fluid-operated means in which separate fluid-pressure means is provided for the traverse and the feed strokes of the tool support; the provision of such a machine tool in which the fluid-pressure means for the traverse operation of the tool support is employed to effect adequate lubrication of the machine; the provision of a machine tool including a work-supporting member and a tool support adapted to be moved relatively toward and from each other by fluid-operated means including separate valve-actuating means for the traverse and feed movements of the tool support, and wherein relatively rotatable means is provided for selectively operating the valve-actuating means; the provision of a machine tool having a work-supporting member that is adapted to be connected to, and disconnected from a continuously rotating positive drive and in which synchronizing mechanism is provided for insuring that the work-supporting member is rotating at the speed at which the continuously rotating positive driving means is rotating prior to effecting a connection between the two; and the provision of a multiple spindle machine tool having a plurality of tool supports and work spindles that are adapted to be moved about a central column, and in which the tool supports are fluid operated and controlled by valve mechanism rendered effective by a stationary cam member.

The above, other objects and novel features of the invention will become apparent from the following description taken with the accompanying drawings in which:

Fig. 2 is a sectional plan view taken substantially along the line 2—2 of Figs. 1 and 4;

Fig. 3 is a sectional plan view taken substantially along line 3—3 of Figs. 1 and 4;

Fig. 4 is a stretch-out sectional elevational view taken substantially along lines 4—4 of Figs. 2 and 3;

Fig. 5 is a diagram showing the development of the feed cam and the path of travel of the cam follower that is connected to the tool support;

Fig. 8 is a layout of the valve-actuating mechanism of Fig. 1.

Figure 1:
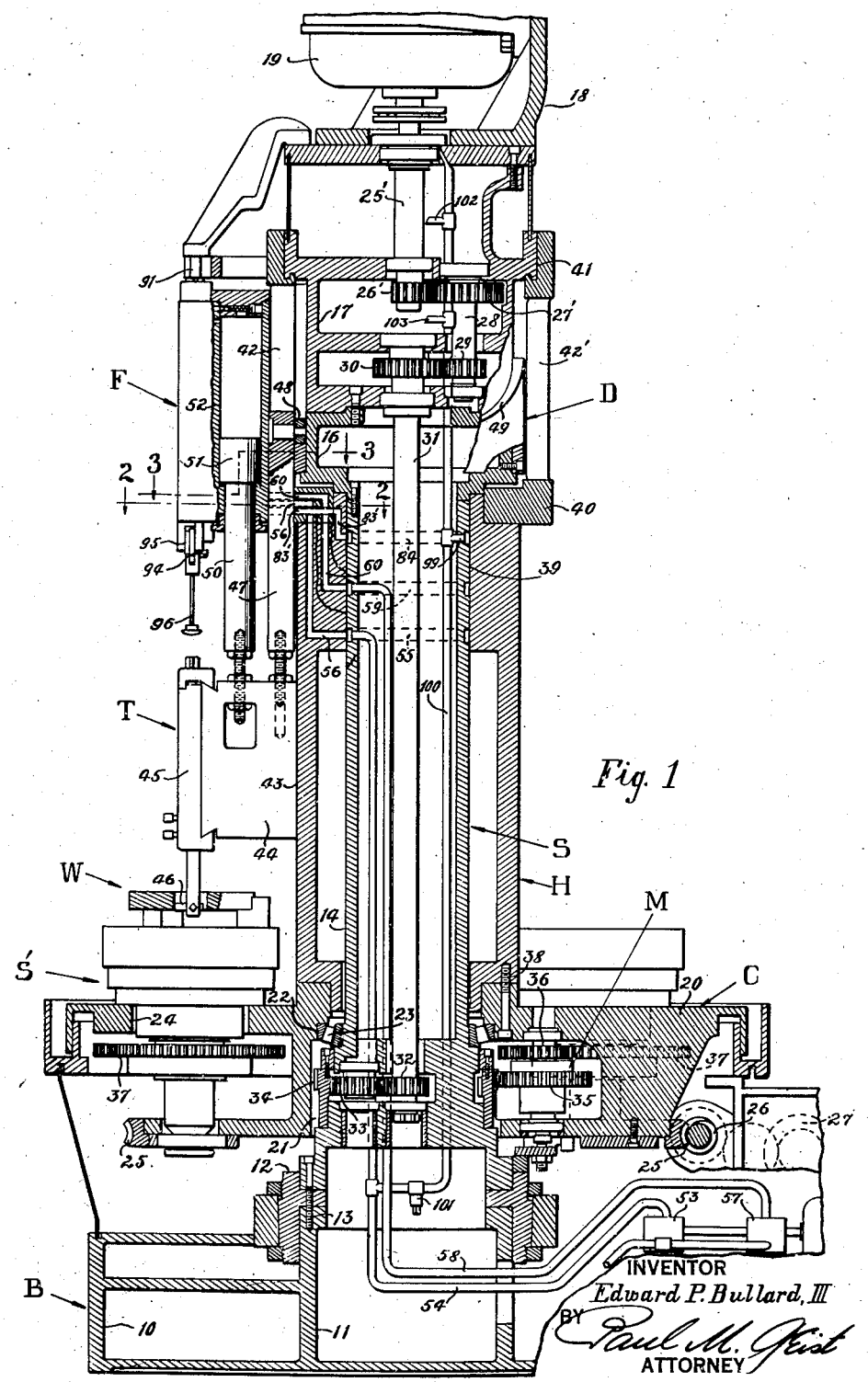
Figure 1 is a sectional elevational view of a multiple spindle machine tool to which the principles of the invention have been applied.

Referring to the drawings, particularly Fig. 1, the invention is shown as applied to a multiple-spindle machine tool of the type disclosed in Patents 1,574,726 and 1,804,971 granted to E. P. Bullard on Feb. 23, 1926, and May 12, 1931, respectively.

The machine tool comprises a base B to which a standard S is rigidly fixed. The standard S provides a support for a rotatable carrier C that is adapted to support a plurality of rotatable work-supporting members such as spindles S'. The carrier C is adapted to be continuously rotated at a relatively slow speed about the standard S during a working operation, while at the same time the individual spindles S' are adapted to be rotated about their axes. The stationary standard S is adapted to support a cam drum D near its upper extremity. The upper portion of the cam drum D forms a support for a motor which is adapted to drive transmission gearing extending downwardly through the stationary standard S and operatively connected to the individual spindles S'. A housing H, fixed to the carrier C and surrounding the stationary standard S, is adapted to provide slide bearings in alignment with each of the work-supporting spindles S' for tool holders T that are adapted to be reciprocated toward and from the work-supporting spindles S'. The tool-supporting members T are adapted to be moved toward and away from the spindles S' by fluid-operated mechanisms F and, during a working operation, the cam drum D is adapted to restrict the rate of movement of the tool supports T toward the work-supporting spindles S'. The cam drum D, however, does not interfere with the free movement of the tool supports away from the spindles S'.

During a portion of the rotation of the carrier C, work W that has been finished is removed from the spindles S' and unfinished work is placed thereon. Obviously, during this time the tool support T must be at its elevated position in order not to interfere with the removal and replacement of the work W. The carrier C rotates continuously at a relatively slow rate during the operation of the machine tool, and should the cam drum D be employed to move the tool holders T away from the work-supporting spindles, a great portion of the rotation of the carrier C about drum D would be consumed because the maximum cam angle that can be employed would require a cam track that would cover a substantial portion of drum D. Furthermore, if the cam drum D is made large enough in diameter to provide ample time to raise the tool holders by cam means, the proportions of the machine become impractical.

The present invention contemplates employing the fluid-operated means F in combination with the cam drum D having a cam track that is substantially entirely effective for work. The fluid-operated means is adapted substantially instantaneously to raise the tool supports T to their highest positions thereby providing maximum time within which to remove completed work and to replace it with unfinished work.

During the removal from, and the replacement of the work on the spindles S', they, of course, must be stopped. Furthermore, after a new piece of work is mounted on the spindles S', they must be connected to continuously rotating driving means. Accordingly, synchronzing mechanism M is provided with each spindle for accomplishing this result.

Referring to Fig. 1, the base B comprises a casting 10, cored out to provide a chamber for a quantity of lubricant that is employed for operating the fluid-operated means F and also for lubricating the working parts of the machine tool. The casting 10 is provided with a centrally disposed annular rib 11 to which the standard S is rigidly connected through a collar 12 by bolts 13. The standard S comprises a relatively long hollow member 14 having a solid base portion that is machined for housing various driving gears for a purpose to be described later. The upper extremity of the hollow standard 14 rigidly supports a cylindrical bracket 16, to which a transmission housing 17 is rigidly united. A motor mounting 18 is fixed to the top of the housing 17 and supports a motor 19 for driving a transmission within the housing 17 to be described later.

The carrier C comprises a disc-like casting 20 having a central opening 21 that includes a raceway 22 for an anti-friction bearing 23 between the carrier C and the lower extremity of the vertically-disposed standard 14. The carrier C is provided with a series of openings 24 arranged in a circle about the casting 20 and adapted to receive the work-supporting spindles S'. A worm gear 25 is connected to the carrier C and meshes with a worm 26 that is driven by a motor 27. Therefore, the carrier C is rotated constantly during the operation of the machine tool at a relatively slow rate of speed by a motor separate from the motor 19 which latter drives the spindles S' as will be described.

The spindles S' are of usual construction and each is provided with spaced bearing portions in the carrier C. They are adapted to be driven by the motor 19 through a transmission mechanism as follows: The motor 19 is adapted to be coupled to a vertically disposed shaft 25' to which a spur gear 26' is keyed. The gear 26' meshes with a gear 27' on a stub shaft 28. The lower end of the shaft 28 fixedly supports a gear 29 that meshes with a similar gear 30 on a relatively long shaft 31. The shaft 31 extends downwardly through the center of the standard 14 and at its bottom fixedly supports a spur gear 32. The gear 32 meshes with a similar spur gear 33 on a stub shaft within the base of the standard 14. An internal-external gear member 34 is journaled about the base of the standard 14,—the internal teeth thereof meshing with the teeth of gear 33, while the external teeth thereof are adapted to mesh with a plurality of spur gears 35 of the respective synchronizing mechanisms M for each spindle S'. A spur gear 36, associated with each of the mechanisms M, is adapted to be driven from the gear 35 through the synchronizing mechanism. These gears 36 are adapted to mesh with their respective spindle gears 37 which latter are keyed to the spindles S'. From the foregoing it is apparent that motor 19 is capable of rotating all of the spindles S' and that by changing the gears 36 and 37, different rotative speeds of each individual spindle S' may be obtained.

The housing H comprises a substantially hollow casting that is adapted to be rigidly fixed to the carrier C by bolts 38. The upper portion of the housing H is provided with a plain bearing surface 39 that mates with a corresponding bearing surface on the upper portion of the stationary standard 14. A hollow cylindrical bracket 40 is fixed to the upper extremity of the housing H, and is adapted to rotate therewith as the carrier C is rotated during operation. The upper portion of the bracket 40 is provided with a retaining bearing 41 that provides a sliding connection between it and the fixed housing 17. Two series of openings 42 and 42' are provided about the outer surface of the bracket 40 thereby exposing the drum D.

Although there is a tool support T and actuating mechanism F of substantially the same construction for each work-supporting spindle S', only one such tool support T and its mechanism F is disclosed and will be described.

Referring to Fig. 1, the central portion of the rotatable housing H is provided with slide bearing surfaces 43 on which the tool supports T are adapted to be reciprocated. These bearing surfaces 43, as well as the openings 42, are in alignment with the respective spindles S'. Accordingly, location of the tool-supporting members T on the bearings 43 places them in cooperative relation with the respective spindles S'. Each tool support T includes a slide member 44 in which a tool holder 45 is dovetailed for reciprocation at right angles to the vertical movement of the member 44. The holder 45 is adapted to support one or more tools such as 46 that are moved into engagement with the work W. The support 44 is connected to a draw bar 47 that extends upwardly to a location adjacent one of the openings 42. The upper extremity of the draw bar 47 is provided with a follower 48 that is adapted to cooperate with the cam track 49 on the cam drum D. The tool-supporting member 44 is provided with a connecting rod 50 having a piston 51 at its upper end that is adapted to be reciprocated within a cylinder 52. The cylinder 52 together with the remainder of the fluid-operated means F is fixed to the bracket 40 and is adapted to rotate with the housing H, as is each of the individual tool-supporting members 44 and its actuating mechanism F. Referring again to Fig. 1, the base B is adapted to contain a supply of lubricating oil for lubricating the various working parts of the machine tool, as well as for supplying fluid pressure to the mechanism F. A fluid-operated pump 53 is adapted to be supplied with lubricant from the supply within base B and to deliver the lubricant under a medium pressure through a conduit 54 that extends upwardly through the center of the stationary standard 14. The upper end of conduit 54 extends through the wall of the standard 14 and empties into an annular groove 55 formed on the periphery of said standard. A passage 56 within the housing H is formed so that it communicates with the annular groove 55 whereby upon rotation of the housing H about the stationary standard 14, the passage 56 is continuously supplied with lubricant under a medium pressure. The opposite end of conduit 56, from that which communicates with the annular groove 55, opens on the peripheral surface of the housing H. A separate fluid-operated pump 57, adjacent to pump 53, is adapted to be supplied with lubricant from base B and it is adapted to supply lubricant under a relatively high pressure through a conduit 58 that extends upwardly through the center of the standard 14 and which opens into an annular groove 59 formed on the outer periphery of the standard. The housing H is provided with a conduit 60, the one end of which communicates with the annular groove 59 and the opposite end of which opens on the periphery of the housing H.

Referring to Figures 1 to 4 inclusive, the fluid-operated means for applying lubricant to alternate sides of the piston 51 comprises a body portion 61 that is adapted to be bolted to the bracket 40 such that the passage 56 will register with a passage 62 (Fig. 2) and passage 60 will register with a passage 63 (Fig. 3). The formation of the various passages for fluid within the body portion 61 is effected by drilling. Accordingly, the places where the drills enter the body portion 61 must be plugged. These openings are all indicated as containing plugs 64'.

The valve member or body 61 is provided with two parallel cylindrical bores 64, 65 within which valve members 66, and 67 are adapted to be reciprocated. Both the valves 66 and 67 are normally urged toward their upper positions by springs 68 and 69 upon which the respective valves are adapted to seat. Referring to Fig. 4, the passage 62, which is the inlet of the medium pressure fluid in the valve body 61 communicates with a passage 70 that joins a vertically disposed passage 71. The passage 71 is located between the passages 64 and 65. Passage 71 is adapted to communicate with each of these valve bores 64 and 65 by passages 72 and 73, respectively.

The passage 63 which serves as the inlet of the high pressure fluid to the valve body 61 communicates with a passage 74 that joins a passage 75 leading to, and communicating with the bore 64 within which valve stem 66 is located. The bores 64 and 65 are adapted to communicate with each other by a passage 76. The bore 65, within which the valve stem 67 is adapted to reciprocate, communicates with the top of the cylinder 52 through a passage 77, and communicates with the bottom of said cylinder through a passage 78 thence through a passage 79. Not only are the passages 77 and 79 employed to deliver fluid under pressure to opposite sides of the piston 51, but they are also employed to carry away or exhaust the fluid from opposite sides of the said piston. Accordingly, an exhaust passage 80 is adapted to communicate with the bore 65 through an opening 81. The exhaust 80 communicates with a passage 82 (Fig. 2) that terminates in an opening 83 in communication with a duct 83', formed in the housing H, and which empties into an annular groove 84 (Fig. 1) on the outer periphery of the standard 14. Although the ducts 56, 60 and 83' are in different radial planes, the upper portions thereof are, for clarity, shown in a single plane in Fig. 1.

Referring to Fig. 4, snubbing means is provided for cushioning the action of the piston 51 at each end of its stroke. This means comprises locating the exhaust from opposite sides of the piston 51 at points spaced a predetermined distance from the end of the stroke of the piston 51. For example, the exhaust from the lower side of the piston 51 passes through an opening 85 that communicates with passage 79. Exhaust from the upper side of piston 51 passes through opening 86 communicating with passage 77. Spring-loaded check valves 87 and 88 are located between passages 79, 77 and the entrances to the cylinder 52. By-passes 89 and 90 are provided around the check valves 87 and 88 so that the fluid that is trapped, after the exhaust passages 85 and 86 are covered by the piston 51, will be exhausted at a much slower rate, thereby effecting a cushioning action to the piston 51.

Referring to Fig. 4, with the valve stems 66 and 67 in their lower positions as shown, fluid under medium pressure enters the passage 62, flows through passage 70, thence through passages 71, 73, across valve bore 65 into duct 78, thence through passage 79, through the check valve 87 and into the cylinder 52 below the piston 51 causing the piston to move upwardly. As the piston 51 moves upwardly, the fluid above the piston exits through the duct 86, passage 77, into bore 65, through duct 81, into passage 80 and thence to the exhaust port 83 (Fig. 2). Movement of the valve stem 67 to its upper position permits the fluid under medium pressure in passage 62 to travel through passage 71, duct 72 into valve bore 64, thence through duct 76, across bore 65, into passage 77, past the check valve 88 and into the cylinder 52 above the piston 51 causing the piston 51 to move downwardly. As the piston 51 moves downwardly, the fluid below the piston is adapted to exhaust through the duct 85, passage 79, duct 78, bore 65, duct 81, passage 80 and outwardly through the exhaust port 83 (Fig. 2). With the valve 67 in its upper position, movement of the valve stem 66 to its upper position permits the high-pressure fluid entering port 63 (Fig. 4) to pass through passage 74, conduit 75, across bore 64, through duct 76, across bore 65, into passage 77, through duct 86 and into the cylinder 52 above the piston 51.

As previously stated, each tool support T is provided with a fluid-operated mechanism F just described, and each such mechanism is adapted to be rotated about the stationary standard 14 with the carrier C. The valves 66 and 67 are adapted to be selectively lowered and released in accordance with a predetermined order. That is to say, means is provided in the form of a stationary cam track 91 (Figs. 1 and 8) fixed to the upper portion of the transmission housing 17 in a position where the successive fluid operated means F will be actuated to effect a predetermined movement of the respective tool supports 44.

Referring to Fig. 8, wherein is disclosed the relation of the cams on cam track 91, reading from right to left, the first operation that occurs is the lowering of valve 67 causing the piston 51 and tool support to move upwardly. Later on, the feed valve 66 is moved downwardly. These two operations occur as the spindles S' approach the loading position of the machine where the completed work is replaced on the spindles S' by unfinished work. After a spindle S' has been reloaded, the traverse valve 67 is permitted to rise as the valve stem 67 passes beyond the extent of the cam track 91, by virtue of the spring 69 forcing it upwardly. At this point, the piston 51 is caused to move downwardly at a traverse rate to lower the roll 48 onto the cam track 49 of the cam drum D. At a predetermined time interval thereafter, the feed valve 66 moves beyond the influence of the cam track 91 and spring 68 causes it to be moved to its upper position whereupon high feeding pressure is admitted to the top of the piston 51 to maintain the roll 48 in contact with the cam track 49 of the drum D during a machining operation on the work W.

Referring to Fig. 5, the action of the roll 48 during the previously described cycle, as shown in Fig. 8, is disclosed in relation to the development of the feed cam track 49 on the cam drum D. From the point 92, Fig. 5, to point 93 (from right to left), represents the effective portion of the cam track 49 on drum D. From the point 93 to the point 92 (from right to left), a safety feature is provided which comprises a portion of cam track that will elevate the roll 48 and the tool support T above the work, thereby preventing the work or tool from damaging each other in the event that the hydraulic means fails to function. During the interval of rotation of the carrier C, when each portion thereof passes the track 93—92 (right to left Fig. 5) of drum D, the roll 48 and tool support T are elevated to their highest positions and lowered so that the roll 48 rests on the cam 49 within a minimum of time, thereby providing a maximum time interval within which to replace the finished work W with unfinished work.

During the operation of the machine tool, it is often desirable and necessary to move any one of the tool supports T to its upper position without waiting until the mechanism F is acted by the cam track 91. Referring to Fig. 4, manually-operable means is associated with each of the mechanisms F for effecting movement of the valve 67 to its lower position thereby causing piston 51 to be raised. An extension of valve stem 67 is provided with a shoulder 94 with which a pivotal cam 95 is adapted to cooperate. The cam 95 is connected to a pull rod 96 through a lost motion joint 97. The design and arrangement of the parts is such that downward movement of the rod 96 causes cam 95 to force the stem 67 downwardly and to move said cam to a self-locking position. Merely forcing rod 96 upwardly releases the stem 67. The rod 96 is adapted to be held in its upper position when not in use by a spring-pressed detent 98.

Referring to Fig. 1, the exhaust from the various fluid-operated mechanisms F empties into the annular passage 84 passes through a duct 99 into the interior of the standard 14. A connection is provided between the duct 99 and a vertically-disposed lubricating pipe 100. The pipe 100 is connected to the conduit 54, and a pressure-relief valve 101 is provided in the pipe 100 for by-passing the fluid incline 54 over and above that required for the cylinders 52. The pipe 100 extends to substantially the top of the machine tool and is provided with various ducts such as 102, 103, etc. which direct the lubricant to the various bearings of the machine tool that require lubrication. Accordingly, the supply of lubricant from the pump 53 that is normally under a medium pressure and employed for traversing the piston 51 in both directions within the cylinder 52, is also employed to provide a lubricating system for the machine tool. The arrangement disclosed and described maintains a substantially constant lubricating pressure because substantially the amount that is withdrawn from the system for moving the piston 51 in either direction is exhausted into the lubricating system from the opposite side of the piston through the annular passage 84 and duct 99 into the pipe 100. Accordingly, no substantial variation in lubricating pressure will occur within the system.

Figures 6, 7:
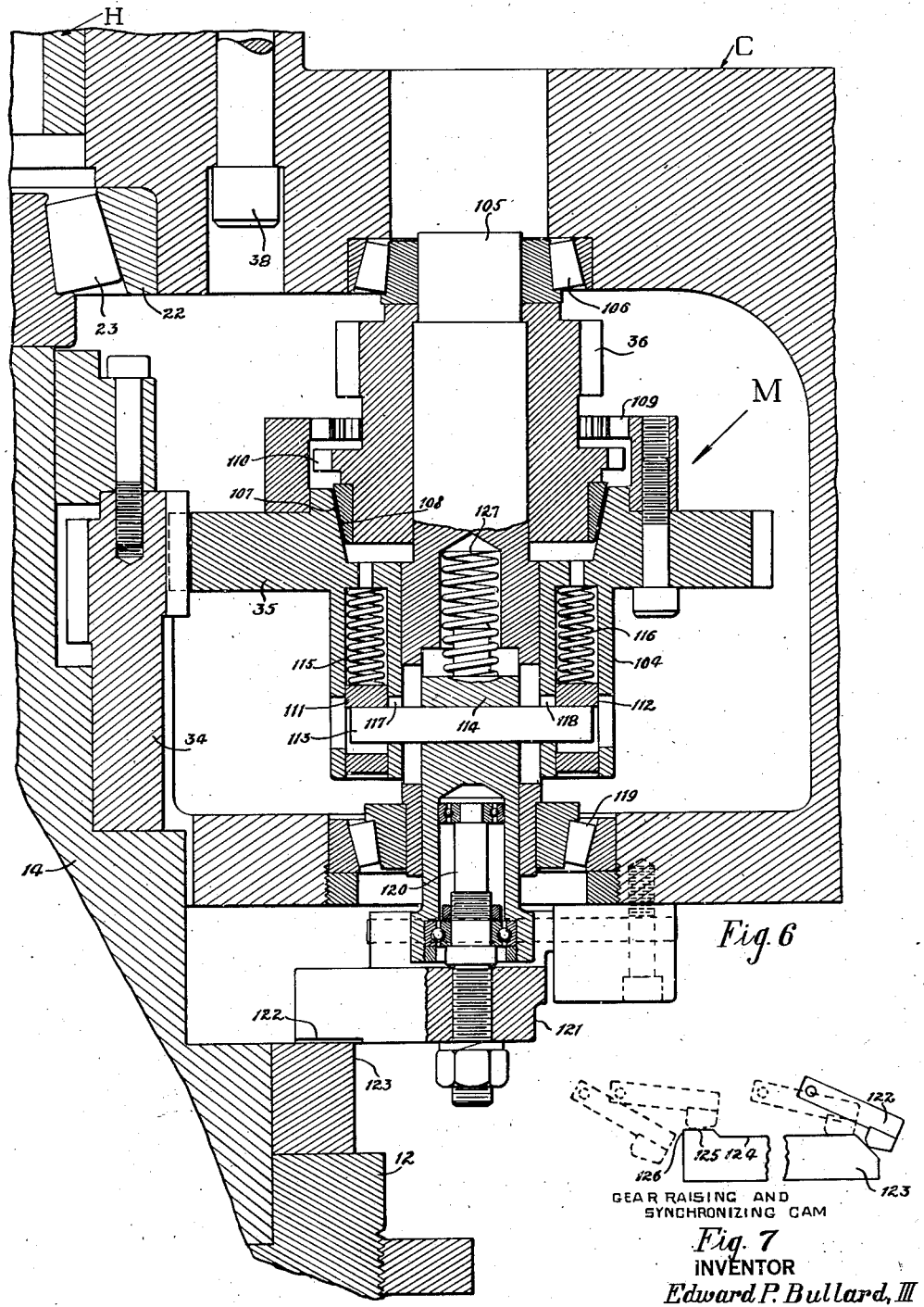
Fig. 6 is an enlarged sectional elevational view of the work supporting member synchronizing means of Fig. 1.
Fig. 7 is a cam layout of the actuating means for the synchronizing mechanism of Fig. 6.

Referring to Figs. 1, 6 and 7, the carrier C is continuously rotated about the standard 14 at a relatively slow rate by the motor 27, while at the same time, the motor 19 rotates the spindles S' through a constantly rotating positive drive. As a spindle S' on the carrier C moves past the loading station, and during the time that the work holder T is in its upper position, it is necessary to stop the spindle, replace the finished work with unfinished work, synchronize the speed of rotation of the spindle and re-connect it to the positive drive.

Referring to Fig. 6, the spur gear 35 that remains constantly in mesh with the external teeth of gear element 34 is provided with a hub portion 104 journaled on the lower end of a shaft 105 mounted in an anti-friction bearing 106 within the carrier C. The gear 35 is provided with a clutch-engaging surface 107 that is adapted to mate with a friction clutch 108 fixed to an extended hub portion of the gear 36. An internal ring gear 109 is fixed to the gear 35, and is adapted to mesh with gear teeth 110 formed on the periphery of the extended hub portion of gear 36. The gear 35 is adapted to be axially moved so that the gear portion 109 is disengaged from the teeth 110 and the clutch engaging surfaces 107 and 108 are engaged.

Relative axial movement of the gear 35 is provided through a resiliently-acting means including plungers 111, 112 mounted within bores of the extended hub portion 104 of the gear 35. The plungers 111, 112 are connected together by a pin 113 supported in an axially-movable member 114. Springs 115 and 116 are located within the bores of hub 104 and bear against the plungers 111, 112. The passages through which the pin 113 extends are enlarged somewhat at 117, 118 so that a slight amount of lost motion may be provided for rendering the shifting means resilient. The member 114 is mounted in anti-friction bearing 119 so that it can rotate with the gear 35. The means employed for axially moving the member 114 comprises a shaft 120 that extends into a recessed portion of the member 114 and which is journaled therein in anti-friction bearings. Accordingly, the shaft 120 need not rotate while the member 114 may rotate. The shaft 120 is rigidly fixed to the forward end of a cam arm 121 that includes a contact portion 122 in alignment with a cam track 123 fixed to the collar 12 on which the standard 14 is rigidly bolted. The developed form of the cam track 123 is disclosed in Fig. 7. It includes an intermediate surface 124 which, when the member 122 rides thereon, causes the gear 35 to be moved upwardly such that the gear 109 is moved out of mesh with the teeth 110, but without the clutch surfaces 107 and 108 being engaged. Cam 123 also includes a higher surface 125, which when in cooperation with the lever 122 causes the gear 35 to be moved further upwardly such that the clutch surfaces 107 and 108 are frictionally engaged to effect synchronization of the speed of the spindle S' with that of gear 35. At the end of the cam 123, a sudden drop off 126 occurs which permits the gear 109 to drop into mesh with the teeth 110 when both are in synchronism. A spring 127 is provided between the shaft 105 and the member 114 for insuring instantaneous breaking of the clutch engaging surfaces 107 and 108 when the lever 122 falls off the point 126 of the cam 123.

From the foregoing, it is apparent that throughout the cycle of operation of the machine tool, the gear 35 constantly rotates at the proper speed; that as a spindle S' approaches the loading station, the cam 123 causes the cam arm 121 to be raised to its intermediate position thereby disengaging gear 36 from 35 without effecting engagement of the clutch surfaces 107, 108 thereby permitting the spindle S' to stop; that near the end of the loading station, the arm 122 moves to its highest position thereby effecting engagement of the clutch surfaces 107, 108 and synchronizing the spindle speed with that of the gears 35 and 109; and finally, when this synchronization has been attained, the engagement of gear 109 with the teeth 110 is effected.

Although the various features of the improved mechanism have been shown and described in detail to fully disclose one embodiment of the invention, it will be evident that numerous changes may be made in such details, and certain features may be used without others without departing from the principles of the invention.

What is claimed is:

1. In a machine tool, a work-supporting member; a tool support; a piston connected to said tool support; a cylinder in which said piston is adapted to be reciprocated; means for restricting the movement of said tool support toward said work-supporting member during a feeding operation, said means permitting unrestricted movement of said tool support away from said work-supporting member; means for supplying fluid pressure to opposite sides of said piston for moving said tool support toward and from said work-supporting member independently of said restricting means during a traverse movement of said tool support; separate fluid pressure means for supplying fluid to said piston for moving said tool-supporting member in cooperative engagement with said restricting means during a feeding movement; and means for cushioning the action of said piston at opposite ends of its path of travel.

2. In a machine tool, a work-supporting member; a tool support adapted to be moved toward and from the work-supporting member; means for rotating said work-supporting member; a piston connected to said tool support; a cylinder in which said piston is adapted to be reciprocated; means for supplying fluid under pressure to opposite sides of said piston for traversing said tool support toward and from said work-supporting member, said means including means for supplying lubricant at a substantially constant pressure to certain parts of said machine tool that require lubrication; and means for exhausting opposite sides of said piston to said lubricant supplying means.

3. In a machine tool, a carrier adapted to support a plurality of work-supporting members; means for rotating said work-supporting members; a standard; means for rotating said carrier about said standard; a plurality of tool supports arranged in alignment with said work-supporting members and adapted to be rotated about said standard with said carrier; a centrally located stationary cam; means connecting said tool supports to said cam including follower means adapted to rest on said cam; fluid-operated means associated with each of said tool supports, including means for controlling the admission of fluid to said fluid-operated means; and a stationary member adapted selectively to operate in succession the fluid-operated means of each of said tool supports as said carrier and said tool supports are rotated about said standard.

4. In a machine tool, a work-supporting member; a tool support; a piston connected to said tool support; a cylinder in which said piston is adapted to be reciprocated; means for restricting the movement of said tool support toward said work-supporting member during a feeding operation, said means permitting unrestricted movement of said tool support away from said work-supporting member; dual pressure supply means including means for supplying a relatively low traverse pressure and a relatively high feeding pressure to said cylinder; a valve body associated with said cylinder adapted to contain valves for selectively admitting fluid under said relatively low pressure to opposite sides of said piston for moving said tool support during a traversing operation, and for admitting relatively high pressure fluid to one side of said piston to maintain said tool support in cooperative engagement with said restricting means during a feeding operation.

5. In a machine tool, a work-supporting member; a tool support adapted to be moved toward and away from said work-supporting member; fluid-operated means for moving said tool support including a unitary structure comprising a cylinder within which a piston is adapted to be reciprocated; a valve body and a plurality of valve-actuating means within said valve body; means for supplying separate fluid pressures to said plurality of valve-actuating means within said valve body; means for automatically actuating said valve means; means for providing relative movement between said unitary assembly and said valve-actuating means for operating said valve mechanism to selectively admit said separate fluid pressures to said cylinder; and manually-operable means connected to one of said valve means for actuating it independently of said automatic means.

6. In a machine tool, a work-supporting member; a tool support adapted to be moved toward and away from said work-supporting member; means for positively controlling the rate of movement of said tool support toward said work-supporting member, and permitting unrestricted movement of said tool support away from said work-supporting member; unitary fluid-operated means for moving said tool support comprising a piston connected to said tool support; a cylinder within which said piston is adapted to be reciprocated; a valve body associated with said cylinder and including a plurality of valve actuating means; fluid-pressure means for supplying fluid to opposite sides of said piston for moving said tool support toward and away from said work-supporting member independently of said controlling means; separate fluid-pressure means for supplying fluid pressure to said cylinder for maintaining cooperation between said tool support and said controlling means during a working operation; means for automatically actuating said valve means in accordance with a predetermined selected order; and manually operable means associated with one of said valve means for moving said tool support away from said work-supporting member independently of said automatic means.

7. In a machine tool, a work-supporting member; a tool support adapted to be moved toward and from the work-supporting member; means for rotating said work-supporting member; a piston connected to said tool support; a cylinder in which said piston is adapted to be reciprocated; means for supplying fluid lubricant under pressure to opposite sides of said piston for traversing said tool support toward and from said work-supporting member; a by-pass leading from said fluid-supply means adapted to direct the fluid lubricant to points of the machine tool requiring lubrication; a relief valve in said by-pass for maintaining a predetermined pressure in the piston supply means; and means for exhausting opposite sides of said piston to said by-pass.

8. In a machine tool, a work-supporting member; a tool support; a cam drum; means for providing continuous relative movement between said tool support and said cam drum while successive pieces of work are operated upon by said machine tool and during the interval between the operation on successive work pieces; a cam track on said cam drum for controlling the movement of said tool support during a working operation; a safety track on said cam drum for moving said tool support away from said work-supporting member during a portion of the relative movement between the cam drum and tool support; and fluid-operated means for moving said tool support away from said work-supporting member substantially instantaneously whereby a maximum of time is provided for removing and replacing work on said work-supporting member during said continuous relative movement.

9. In a machine tool, a stationary standard; a carrier adapted to support a plurality of work-supporting members; means for rotating said work-supporting members; means for rotating said carrier about said standard; a plurality of tool supports arranged in alignment with said work-supporting members and adapted to be rotated about said standard with said carrier; fluid-operated means associated with each of said tool supports for controlling their movement; means for conveying fluid through said standard; means for conducting said fluid from said stationary standard to said fluid-operated means associated with each of said tool supports; and means adapted to selectively actuate said fluid-operated means for controlling the movement of said tool supports toward and away from said work-supporting members.

10. In a machine tool, a stationary standard; a carrier adapted to support a plurality of work-supporting members; means for rotating said work-supporting members; means for rotating said carrier about said standard; a plurality of tool supports arranged in alignment with said work-supporting members and adapted to be rotated about said standard with said carrier; a piston connected to each of said tool supports; a cylinder in which each of said pistons is adapted to be reciprocated; a centrally located stationary cam; means connecting said tool supports to said cam including follower means adapted to rest on said cam, said cam being adapted to restrict the movement of said tool supports toward said work-supporting members during a feeding operation, and permitting unrestricted movement of said tool supports away from said work-supporting members; and means for supplying fluid pressure to opposite sides of said piston for moving said tool supports toward and from said work-supporting members independently of said restricting means and for maintaining cooperation between said follower means and said stationary cam during a working operation.

11. In a machine tool, a stationary standard; a carrier adapted to support a plurality of work-supporting members; means for rotating said work-supporting members; means for rotating said carrier about said standard; a plurality of tool supports arranged in alignment with said work-supporting members and adapted to be rotated about said standard with said carrier; a piston connected to each of said tool supports; a cylinder in which each of said pistons is adapted to be reciprocated; a centrally located stationary cam for restricting the movement of said tool supports toward said work-supporting members during a feeding operation, and permitting unrestricted movement of said tool supports away from said work-supporting members; means for supplying fluid pressure to opposite sides of said pistons for moving said tool supports toward and from said work supporting members independently of said restricting means; and separate fluid pressure means for maintaining said tool supports in cooperative engagement with said restricting means.

12. In a machine tool, a stationary standard; a carrier adapted to support a plurality of work-supporting members; means for rotating said work-supporting members; means for rotating said carrier about said standard; a plurality of tool supports arranged in alignment with said work-supporting members adapted to be rotated about said standard with said carrier; a piston connected to each of said tool supports; a cylinder in which each of said pistons is adapted to be reciprocated; a centrally located stationary cam for restricting the movement of said tool supports toward said work-supporting members during a feeding operation, and permitting unrestricted movement of said tool supports away from said work-supporting members; means for supplying fluid pressure to opposite sides of said pistons for moving said tool supports toward and from said work-supporting members independently of said restricting means; separate fluid pressure means for maintaining said tool supports in cooperative engagement with said restricting means during a working operation; and means for cushioning the action of said pistons at the ends of their paths of travel.

13. In a machine tool, a stationary standard; a carrier adapted to support a plurality of work-supporting members; means for rotating said work-supporting members; means for rotating said carrier about said standard; a plurality of tool supports arranged in alignment with said work-supporting members and adapted to be rotated about said standard with said carrier; a piston connected to each of said tool supports; a cylinder in which each of said pistons is adapted to be reciprocated; means for supplying fluid lubricant under pressure to opposite sides of said pistons for traversing said tool supports toward and from said work-supporting members, said means including means for supplying lubricant at a substantially constant pressure to certain parts of said machine tool that require lubrication; and means for exhausting opposite sides of said pistons into said lubricating supply means.

14. In a machine tool, a stationary standard; a carrier adapted to support a plurality of work-supporting members; means for rotating said work-supporting members; means for rotating said carrier about said standard; a plurality of tool supports arranged in alignment with said work-supporting members adapted to be rotated about said standard with said carrier; stationary cam means for positively restricting the rate of movement of said tool supports toward said work-supporting members; and fluid-operated means associated with each of said tool supports for traversing said tool supports toward and away from said work-supporting members during a minimum portion of the rotation of said tool supports relatively to said cam means, thereby providing a maximum portion of the relative rotation between said cam means and tool supports for loading, unloading and working on work.

15. In a machine tool, a stationary standard; a carrier adapted to support a plurality of work-supporting members; means for rotating said work-supporting members; means for rotating said carrier about said standard while successive work pieces are adapted to be operated upon; a plurality of tool supports arranged in alignment with said work-supporting members and adapted to be rotated about said standard with said carrier; a centrally located stationary cam; follower means associated with said tool supports adapted to rest on said cam; the construction and arrangement of said cam and tool supports being such that completed work is replaced by uncompleted work while said carrier and tool supports move relatively to a portion of said cam; and fluid-operated means associated with each of said tool supports for moving said tool supports away from said work-supporting members substantially instantaneously when said carrier arrives at said portion of said cam.

16. In a machine tool, a stationary standard; a carrier adapted to support a plurality of work-supporting members; means for rotating said work-supporting members; means for rotating said carrier about said standard at a constant speed while successive pieces of work are operated upon; a plurality of tool supports arranged in alignment with said work-supporting members adapted to be rotated about said standard with said carrier; a stationary cam; a cam track covering a portion of said stationary cam for controlling the movement of said tool supports toward said work-supporting members during successive working operations; fluid operated means for moving said tool supports away from said work-supporting members as they successively pass by another portion of said cam; and a safety cam track covering the latter portion of said cam drum adapted to move said tool supports away from the work-supporting members so that the tools clear the work as the work-supporting members pass said latter portion of said cam drum.

17. In a machine tool, a stationary standard; a carrier adapted to support a plurality of work-supporting members; means for rotating said work-supporting members; means for rotating said carrier about said standard; a plurality of tool supports arranged in alignment with said work-supporting members adapted to be rotated about said standard with said carrier; fluid-operated means for moving said tool supports toward and from said work-supporting members; valve means associated with each of said fluid-operated means for admitting fluid pressure to said fluid-operated means; and means for selectively actuating said valve means in accordance with a predetermined order.

18. In a machine tool, a standard; a carrier adapted to support a plurality of work-supporting members; means for rotating said work-supporting members; means for rotating said carrier about said standard; a plurality of tool supports arranged in alignment with said work-supporting members adapted to be rotated about said standard with said carrier; a centrally located stationary cam; means connecting said tool supports to said cam including follower means adapted to rest on said cam; fluid-operated means associated with each of said tool supports; valve means associated with each of said fluid-operated means for admitting fluid pressure to said fluid-operated means; and stationary means for selectively actuating said valve means as said carrier and said tool supports move about said standard.

19. In a machine tool, a standard; a carrier adapted to support a plurality of work-supporting members; means for rotating said work-supporting members; means for rotating said carrier about said standard; a constantly operating driving means for said work-supporting members; a friction clutch between said work-supporting members and said constantly operating driving means; a releasable positive drive between said constantly operating driving means and said work-supporting members; stationary cam means adapted to selectively disengage said releasable positive driving means without engaging said friction driving means thereby permitting the work-supporting members to stop rotating; means for effecting engagement of said friction clutch means thereby to synchronize the speed of the work-supporting members with said constantly rotating driving means; and means for simultaneously disengaging said friction clutch means and for engaging said positive driving means.

20. In a machine tool, a stationary standard; a carrier adapted to support a plurality of work-supporting members; means for rotating said work-supporting members; means for rotating said carrier about said standard; a plurality of tool supports arranged in alignment with said work-supporting members adapted to be rotated about said standard with said carrier; stationary cam means for positively restricting the rate of relative movement between said supports in one direction during a working operation and for permitting unrestricted relative movement between said supports in both directions during traverse; and fluid-operated means for providing traverse relative movement between said supports in both directions during a minimum portion of the rotation of said tool supports relatively to said cam means, thereby providing a maximum portion of the relative rotation between said cam means and tool supports for loading, unloading and operating on work.

21. In a machine tool, a standard; a carrier adapted to support a plurality of work-supporting members; means for rotating said work-supporting members; means for moving said carrier about said standard; a plurality of tool supports arranged about said standard; cam means for positively restricting the rate of movement of said tool supports toward said work-supporting members; means for providing relative movement between said cam means and said tool supports; and fluid-operated means associated with each of said tool supports for traversing said tool supports toward and away from said work-supporting members during a minimum portion of the relative movement between said cam means and said tool supports.

EDWARD P. BULLARD, III.